Dec. 29, 1964 K. SCHWENDENWEIN 3,162,926
LATHE CONSTRUCTION
Filed July 10, 1962 3 Sheets-Sheet 1

Inventor:
KARL SCHWENDENWEIN

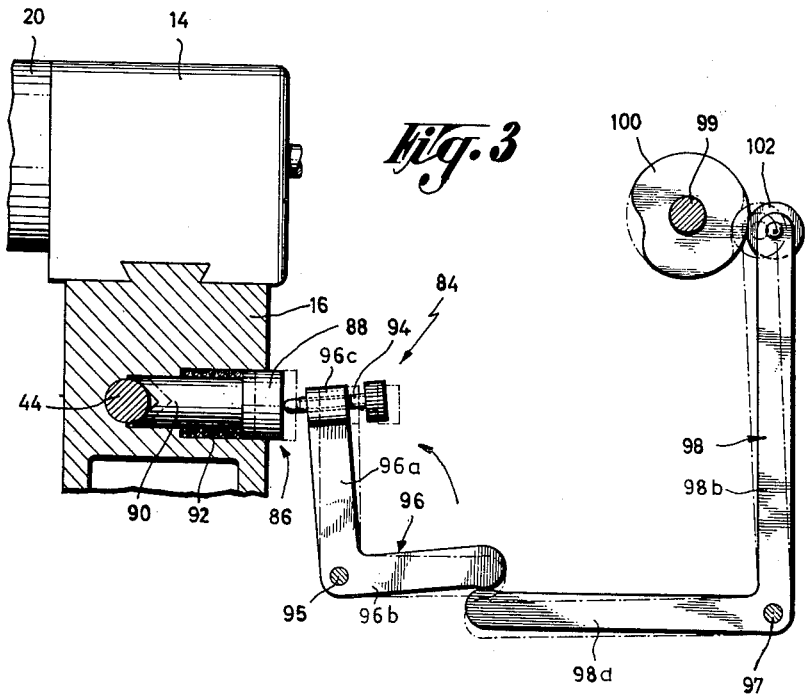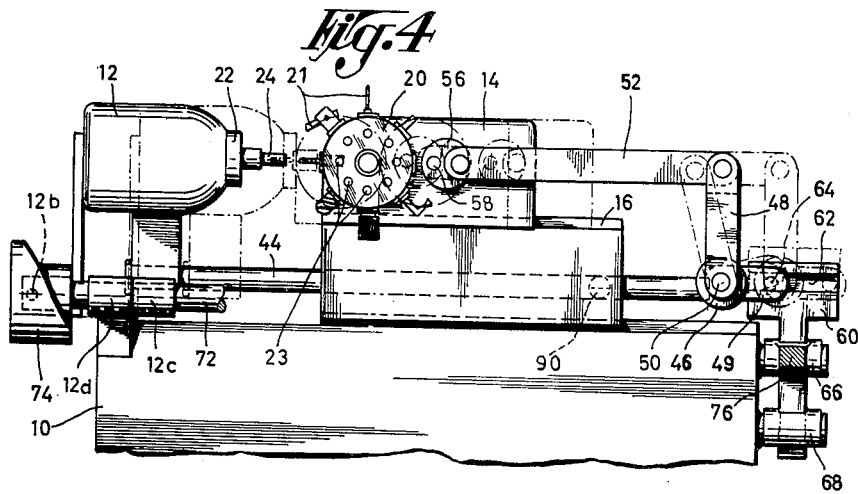

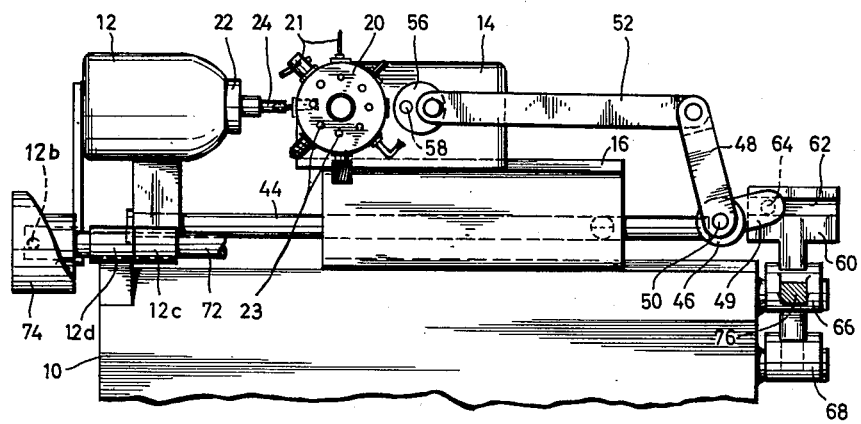

United States Patent Office 3,162,926
Patented Dec. 29, 1964

3,162,926
LATHE CONSTRUCTION
Karl Schwendenwein, Paracelsiusstrasse 48,
Esslingen (Neckar), Germany
Filed July 10, 1962, Ser. No. 208,787
Claims priority, application Germany July 13, 1961
8 Claims. (Cl. 29—44)

This invention relates in general to automatic lathes or turning machines and in particular to a new and useful automatic lathe having a tool supporting head stock which is automatically displaceable on a slide in accordance with a feed cam movement and a turret slide connected to the head stock through a connecting rod and a lever mechanism, the latter being provided for switching a rotatable turret head of the turret slide and including means to clamp the connecting rod in position during each cycle of rotation of the turret head.

The present invention is particularly applicable to an automatic lathe which includes a turret head having a rotatable turret for holding tools which may be indexed to position a desired tool in sequence in an operative position in relation to a work piece held by a head stock. In the present case the head stock is rigidly connected to a connecting rod which is articulated at its opposite end through a lever system to the turret slide so that the head stock and the turret slide move longitudinally on the mounting. The lever mechanism connected between the connecting rod and the turret slide provides means for switching the turret head to position a desired tool in an operative position.

In turret machines of this character the exchange of the tools or the switching of the turret head is usually accomplished as follows: the turret slide is first moved back at high speed from its working or operating position into an end position. In the end position the turret head is then rotated to position a new tool in a working orientation. After the switching is accomplished, the turret head is rapidly returned to the working position to locate the new tool directly adjacent the workpiece carried by the head stock.

The transport movement and also the actuation of the turret head is accomplished in the known constructions by the same switching gear and for this purpose there is provided a crank which is mounted in the turret slide. The crank in the turret slide carries a lever mechanism for transmitting the feed of the remaining operating parts. With such a construction, however, it has been found that during high speed transport movement of the turret slide and also during switching of the turret head there occurs a horizontal component of force on the mounting of the lever system or on the connecting rod, which force acts in two directions. This force is transmitted as impacts and vibrations to the head stock which is secured to the connecting rod. This, in turn, causes markings or non-permissible grooves to be found in the workpiece when the workpiece is being turned at the same time. Hence it is difficult to perform certain smooth operations on a lathe of this character when it is necessary to shift the turret head at the same time. This applies particularly to grooving, facing and trimming operations.

In some instances it has been attempted to overcome the above disadvantages during the operation of the lathe by switching the turret head only when it is in the rearward position of the turret slide, in which case only a relatively insignificant horizontal force will occur. This measure, however, has proved not to be entirely satisfactory, and has the disadvantage that it requires additional time for movement of the turret head to the rearward position during each cycle.

In accordance with the present invention there is provided a lathe of this character in which the head stock is connected to a connecting rod and the connecting rod is connected, in turn, via a control linkage, to the turret slide. The control linkage includes means for indexing the turret head and the whole arrangement includes means for insuring that the connecting rod is clamped when the turret head is indexed. Thus, the machine permits the turning or switching of the turret head without the disadvantageous effects on the head stock produced by forces transmittted to the connecting rod. The arrangement also permits the rapid movement of the turret slide and effectively cuts down the time required for the switching of the turret head. The clamping device which holds the connecting rod is always actuated during the switching of the turret head. The clamping device advantageously includes, for example, means embracing the connecting rod for clamping purposes, and which is operable during the switching of the turret head. The clamping device is advantageously provided in a stationary portion of the machine or may be carried in the movable portion which effects the clamping of the connecting rod against a stationary part.

A feature of the invention is that the clamping device is actuated by means of a switching gear which is driven by an auxiliary control shaft. In some instances, however, it is also desirable to mount the clamping element so that it is actuated by an electrical switch which is thrown in during positioning of the various components of the turret head in a particular manner. For example, a cam disc driven by the switching gear may be advantageously arranged to actuate an electrical impulse generator. A favorable construction is also obtained when the switching gear comprises a cam which, during switching of the turret head, is forced to act on a lever mechanism in order to actuate the clamping device and in doing so the respective position of the turret slide is immaterial. The control mechanism is advantageously connected to the clamping device so that the clamping of the connecting rod is stopped when the tool has been moved into a position to operate upon the workpiece by rotation of the turret head.

Accordingly, it is an object of this invention to provide an improved automatic lathe construction.

A further object of this invention is to provide an automatic lathe including a head stock mounted for longitudinal, displaceable movement, a turret slide mounted for longitudinal movement, and a connecting rod affixed to the head stock and connected through a control mechanism including means for indexing the turret head and for clamping the connecting rod during such indexing.

A further object of the invention is to provide an automatic turning machine having a head stock which is longitudinally displaceable by means of a feed cam and having a turret slide which is longitudinally displaceable on a stationary slide, which turret slide via a lever mechanism is connected to a connecting rod, the lever mechanism serving the purpose of transmitting the feed to the turret slide and being connected to a switching or control device for switching the turret head, and where in a clamping device is provided for clamping the connecting rod which is actuated via an actuating device during the switching of the turret head.

A further object of the invention is to provide an automatic lathe which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 3 is a partial vertical section taken along the line 3—3 of FIG. 1;

FIG. 4 is a vertical section taken along the line 4—4 of FIG. 1; and

FIG. 5 is a section similar to FIG. 4 but indicating the parts in an advanced position.

Figure 1:
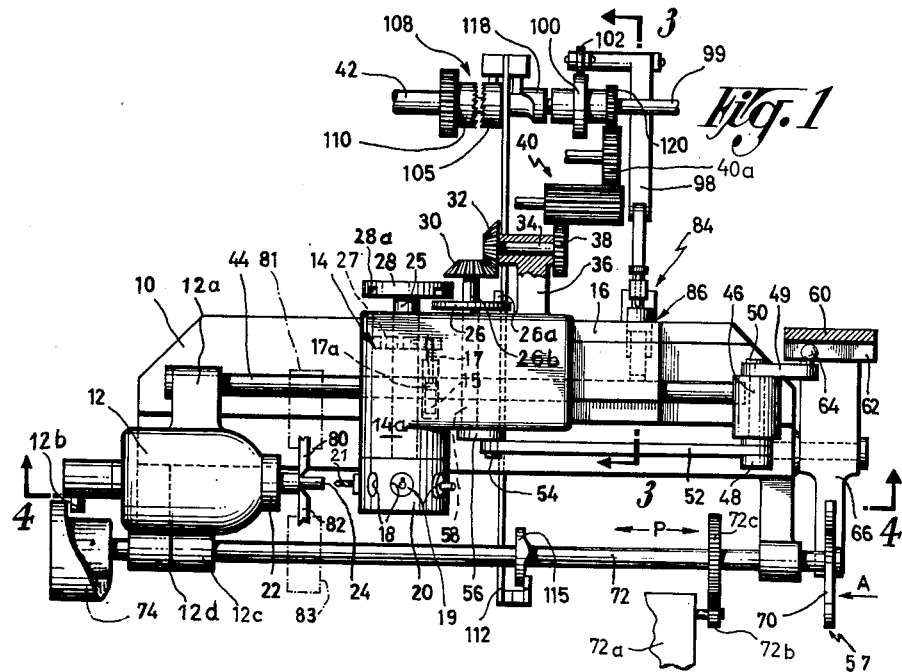
FIG. 1 is a somewhat schematic, partly broken away plan view of an automatic turning machine constructed in accordance with the invention.

Referring to the drawings in particular, the invention embodied therein includes an automatic turning machine or lathe including a machine frame 10 which supports a head stock 12 for automatic movement in a longitudinal direction. The head stock 12 is associated with a turret slide 14 arranged on a turret slide guide 16 at a laterally displaced location in respect to the head stock.

The turret slide 14 is provided with a cylindrical portion 14a at one end of which is mounted a rotatable turret head 20. The head has a plurality of openings arranged at circumferentially spaced locations to receive a tool holder 18 which carries a tool 21 therein. The turret head 20 is indexed automatically to position a tool 21 in alignment with a workpiece 24 which is held in a chuck 22 of the head stock 12. Tools 21 are secured in known manner in the individual tool receptacles by means of a plug cone or the like. For the purpose of replacing or exchanging tools, recesses 23 (FIG. 4) are provided at the end face of the turret head 20 in which recesses a suitable tool may be inserted in order to loosen the plug cones.

Figure 2:
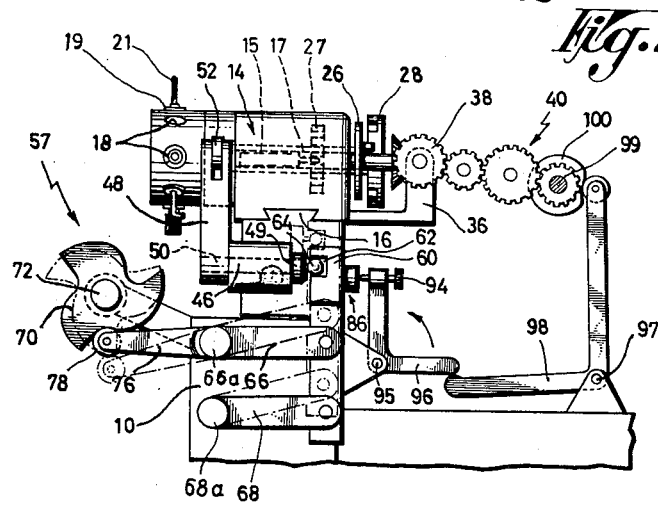
FIG. 2 is a partial right hand end elevation of the machine indicated in FIG. 1.

As seen particularly in FIGS. 1 and 2 the turret head 20 is switched by means of a Malteser disc 28 which is actuated by a roller disc 26. For this purpose the roller disc 26 has projections 26a which fit into grooves 28a of the Malteser disc 28. The disc 26 is mounted on a shaft 26b which carries a bevel gear 30 which is rotated by a bevel gear 32. The bevel gear 32 is affixed to a shaft 34 which is held on a bracket or extension 36 of the turret slide 14. The shaft 34 carries a spur gear 38 which is rotated via intermediate gear 40, idle gear 40a and a gear 120 which is mounted on a shaft 99 and articulated by the rotation of a shaft 42 in a manner to be described more fully hereinafter.

After the turret head 20 is indexed to the desired position it is locked in such working position by means of a locking device 15 (see FIG. 2). The locking device 15 is accommodated in the turret slide 14 and may, for example, be of a hydraulic nature. The locking device 15 fixes the tool 21 of the holder 19 in a working position relative to the workpiece 24. Locking is accomplished by means of a bolt 17 which is connected with a piston 17a in the cylinder of the locking device 15. The bolt 17 engages in a corresponding recess or cutout of a perforated disc 27 which is affixed to the carrier shaft 25 of the turret head 20. Actuation of device 15 is controlled by cam 115 on rotatable control shaft 72 through operator 112.

In accordance with the invention any change of the feeding or movement of the head stock and turret slide is avoided during turning or rotation of the turret head 20. For this reason the construction is made so that the turret slide 14, independently from its feed movement, traverses the same length of path as the head stock 12. In FIG. 4 the dot-dash line representation indicates an opposite extreme position of movement of the head stock and turret slide. In moving the elements the head stock 12 is imparted with a negative feed movement. This is effected by means of a connecting rod 44 which is connected to the head stock 12 at its one end, such as to an extension 12a of the head stock. The connecting rod 44 is slidably mounted in the slide guide 16 for longitudinal movement relative to the machine frame. The rod 44 carries at its opposite end a connecting head on bearing sleeve 46 in which is arranged a shaft 50 carrying an angular lever 48. The angular lever 48 is pivotally connected at its outer end to a push rod 52 which effects actuation of the turret, that is, it causes the feed movement of the turret slide in a longitudinal direction. The push rod 52 is rotatably connected to a pin 54 of a crank 56. The crank 56, in turn, is secured on a shaft 58. In FIGS. 1 and 4 the shaft 58 is mounted in the turret slide 14 and carries the roller disc 26. The turret slide and the head stock traverse the same path during the turning of the turret head 20. The feed movement, as mentioned, is a negative feed movement during turning and is caused by a feed device which can be particularly seen in FIG. 2 and is designated as an entity generally by the reference numeral 57.

The feed mechanism 57 includes the angular lever 48 which is connected to the turret slide via the push rod 52. The angular lever 48 is imparted with a predetermined rotational movement in accordance with the magnitude of the feed to be imparted. For this purpose there is provided at the machine bed 10 a coulisse (see FIGS. 1 and 4) which is a block member having an elongated slide or groove 62. A follower pin 64 is guided in the groove and it is carried on an arm 49 which is affixed to the shaft 50. Follower pin 64 is ball-shaped and the coulisse is vertically movable for turning the angular lever 49. This movement is obtained by double-armed lever 66 and a simple lever 68. The coulisse 60 is shifted vertically by means of the parallel linkage arms 66 and 68 which are mounted on pivot pins 66a and 68a on the machine bed 10. Parallel linkage thus formed includes an extending arm 76 having a rotatable follower 78 at its free end which rides over a feed cam 70 which is affixed to a control shaft 72 held rotatably supported on the machine bed 10. Pivotal movement of the arm portion 76 between the dotted line—solid line position indicated in FIG. 2 will shift position of the coulisse 60 from the solid line position to the dotted line position shown thereabove. As indicated in FIG. 1 the shaft 72 also contains a cam 74 which is rotated therewith in order to effect shifting of the head stock 12 by engagement of a pin 12b with the surface of the cam 74. The head stock 12 advantageously includes a bearing collar portion 12c which embraces the shaft 72 and is slidable therealong.

Corresponding to the construction of the individual cam sections of cam 70, upon rotation of shaft 72, the coulisse 60 will be moved by cam 70 vertically along a predetermined path due to the action of the levers 66 and 68, and thereby a feed movement is imparted to the turret slide 14 via the angular lever mechanisms 49, 50, 48 and 52 and movement is accomplished from the solid line position to the dotted line position, as indicated in FIG. 4. At the same time, cam 74 is rotated by shaft 72, and thus moves head stock 12 to the right toward turret 14. Through rod 44, sleeve 46 and shaft 50 are also moved to the right at the same time as turret 14 is moved to the left relative to sleeve 48.

The angular adjustment of turret 14 occurs in the following manner. The turret slide 14 includes the revolving turret head 20 which is angularly adjusted or indexed, to bring each tool 21 into an operative position in succession, by means of the roller disc 26 in cooperation with the Malteser disc 28 when the locking device 15 is unlocked by operation of cam 115 and operator 112. The disc 26 is turned 360° by the auxiliary shaft 42 driving through the gear train 40 for each individual switching step. At the same time, the crank 56 rotates the shaft 58 by one complete revolution. During this rotation, the rod head or sleeve 46 of the connecting rod 44, which is connected by the crank 48 to the push rod 52, forms a stationary point. In this manner, in the course of the 360° rotation of the auxiliary shaft, the turret slide 14 moves from its working position to a switching position, with the switching of the turret head 20 taking place at its greatest distance from the workpiece 24. As the rotation of shaft 58 continues, a new tool 21, which is now intended for working purposes, is again brought into working position by rotation of the turret head 20 and return movement thereof to the left. The movement of the turret slide 14, as described above, must be rapid to insure a minimum of time for the switching of the turret head 20. This means that the mass of the turret head must be very rapidly accelerated and then delayed, respectively, and in both directions. Therefore, at the rod head 46 a correspondingly large horizontal component P will be active. This component is transmitted by the connecting rod 44 to the head stock 12 so that during turning, that is, during overturning of the workpiece by means of turning tools 80 and 82 positioned on each side of the workpiece, as indicated in FIG. 1, perfect turning cannot be accomplished without the invention. The tools 80 and 82 are shown in FIG. 1 secured in stationary holders 81 and 83 shown in dotted lines.

In order to prevent the above, in accordance with the invention there is provided a clamping device which is generally designated by the numeral 84 (see FIG. 3). With the aid of this clamping device 84 the connecting rod 44, during the movement of the turret head 20, is clamped to the machine frame or in the slide guide, so that the horizontal component P which acts thereon, will be taken up or absorbed by the connecting rod and the frame and not on the head stock 12.

The clamping mechanism 84 includes a clamping piece generally designated 86 which includes a clamping bolt 90 which in turn is provided with a guide shaft or widened head portion 88. The clamping bolt 90 has an end which is notched in a prism-shaped manner to permit opposed surfaces to bear around a large portion of the connecting rod 44. The base 10 is provided with a recess large enough to also accommodate a compression spring 92 which is compressed between the inner ledge of the recess and the head portion 88 of the clamping piece 86. Spring 92 urges the bolt 90 in a direction away from clamping engagement with the connecting rod 44.

An angular lever 96 is provided, which acts on the clamping piece and which is pivoted at 95 to a portion of the machine frame. The lever includes one arm 96a which carries a threaded collar 96c in which a set screw 94 is rotatable. The set screw may be rotated to cause an end thereof to bear against the head 88 of the bolt 90. Another arm 96b of the crank lever 96 rests against an arm 98a of a lever 98 which is pivoted at 97 on a portion of the machine frame. An opposite arm portion 98b is provided with a roller 102 which is in rolling engagement with a cam 100 which is affixed to a shaft 99.

Referring particularly to FIGS. 1 and 3 the actuation of the lever 98 is accomplished by means of the cam 100 which is arranged on the carrier shaft 99. In the rest position according to FIG. 2, the roller 102 is situated at the deepest point or lowest point of the cam so that no pressure is exerted on the clamping piece 86 which includes the bolt 90. Cam 100 is connected with the driven half 105 of a quick switch coupling or clutch, the other half 110 of which is secured to the shaft 42. The shaft 42 is constantly rotated and the coupling 108 is actuated via a mechanical switching device 112 which is shifted by means of a cam 115 affixed to the shaft 72. A driven half of the clutch 105 is connected with an escape cam 118 which is arranged to decouple the driven half from the driving half after the driven half is rotated each 360°. The drive which takes place during the coupling of elements 110 and 105 is transmitted from the auxiliary shaft 99 through a spur gear 120 affixed thereto and gear 48 to rotate shaft 26b which carries the disc 26.

If one of the protuberances on the cam disc 115 engages the element 112, the coupling 108 is actuated for switching or movement of the turret head 20 and then the cam roller 102 rolls along the surface of the cam 100, whereby the angular lever 96 is moved in the direction of the arrow by the lever 98 to exert pressure on the clamping piece 86 for clamping the connecting rod 44 in a stationary position in the slide guide (see FIG. 3). At the moment of the decoupling of the drive the clamping pressure is again eliminated by the escaping cam 118 because then the roller cam 102 will again reach the deepest cam point, as shown in FIG. 3, in the dot-dash line position.

While a specific embodiment of the invention has been shown and described in detail to illustrate the application of the invention principles, it will be understood that the invention may be embodied otherwise without departing from such principles.

What is claimed is:

1. An automatic turning machine comprising a head stock for holding work pieces, means for supporting said head stock for longitudinal displaceable movement, a turret slide, means supporting said turret slide for longitudinal movement, a connecting rod connected to said head stock, said turret slide having a rotatable turret head adapted to carry a plurality of tool pieces thereon, said rotatable head being rotatable to position a tool piece thereon in an operative working position, a lever mechanism connected to said connecting rod and including means for rotating said turret head, control means for said lever means, and clamping means connected to said lever mechanism effective to clamp said connecting rod during rotation of said turret head.

2. A turning machine according to claim 1, wherein said clamping means includes switching gear connected to said lever mechanism to rotate said turret and an auxiliary control shaft controlled by said control means and articulated by said switching gear for actuating said clamping means.

3. An automatic turning machine according to claim 1, wherein said lever mechanism includes a rotatable crank arm, driving means for rotating said crank arm, including clutching means, said clutching means including a driving shaft and a driven shaft carrying a cam thereon, said clamping means including a clamping bolt engageable with said connecting rod, and a lever control including a roller follower engageable with said cam movable to actuate said clamping bolt during rotation of said turret head.

4. An automatic turning machine comprising a mounting frame, a head stock displaceable on said mounting frame, a turret slide displaceable on said mounting frame, a connecting rod connected at one end to said head stock and carrying at its opposite end a connecting head, lever means carried by said connecting head, said turret slide having a rotatable tool holding head member, head rotating means connected to said lever means for rotating said head, control means for said lever means, and clamping means associated with said means for rotating said head to clamp said connecting rod during rotation of said head.

5. An automatic turning machine comprising a mounting base, a head stock displaceable on said mounting base, a turret slide having a rotatable head portion displaceable on said mounting base, a connecting rod connected to said head stock at one end, lever means connecting said connecting rod at its opposite end to said turret slide, means on said turret slide connected to said lever means for rotating said turret, control means for said lever means, and clamping means connected to said turret rotating means including a member movable to clamp said connecting rod during rotation of said turret head.

6. A turning machine according to claim 5, wherein said lever means includes means to disconnect said clamping means when said head stock and said turret slide are displaced.

7. A turning machine according to claim 6, wherein said means to disconnect said clamping means includes a clutch member, a control shaft included in said control means, and a control element operatively connected to said control shaft and to said clutch member to disconnect said clutch during displacement of said turret slide and said head stock.

8. A turning machine according to claim 5, wherein said clamping means includes a bolt element adapted to bear against said connecting rod, means to bias said bolt element out of clamping engagement with said connecting rod, and a lever adapted to bear against said bolt member upon actuation of said clamping means by said turret head rotating means.

No references cited.